US005490002A

United States Patent [19]
Nicholas

[11] Patent Number: 5,490,002
[45] Date of Patent: Feb. 6, 1996

[54] ACTIVE MATRIX DISPLAY DEVICES HAVING BIDIRECTIONAL NON-LINEAR DEVICES CONNECTED BETWEEN ADJACENT PIXELS AND RESPECTIVE ADDRESS CONDUCTOR

[75] Inventor: Keith H. Nicholas, Reigate, England

[73] Assignee: U.S. Philips Corporation, New York, N.Y.

[21] Appl. No.: 280,745

[22] Filed: Jul. 26, 1994

[30] Foreign Application Priority Data

Aug. 3, 1993 [GB] United Kingdom ............... 9316101

[51] Int. Cl.$^6$ ................................................ G02F 1/136
[52] U.S. Cl. ...................................... 359/58; 359/60
[58] Field of Search .............................. 359/58, 60, 54, 359/55, 59; 345/90, 91, 93

[56] References Cited

U.S. PATENT DOCUMENTS

| | | | |
|---|---|---|---|
| 4,642,620 | 2/1987 | Togashi et al. | 359/60 |
| 5,025,250 | 6/1991 | Hains | 359/60 |
| 5,069,534 | 3/1991 | Hirai | 359/74 |
| 5,101,288 | 3/1992 | Ohta et al. | 359/58 |
| 5,161,237 | 11/1992 | Hartman et al. | 359/58 |
| 5,234,541 | 8/1993 | Shannon et al. | 359/62 |

OTHER PUBLICATIONS

"Flicker-Free LCD With Bridge-Structure SiN$_x$ TFD," by Y. Hirai et al., SID 90 Digest, pp. 522–525.

Primary Examiner—William L. Sikes
Assistant Examiner—Tai V. Duong
Attorney, Agent, or Firm—John C. Fox; Norman N. Spain

[57] ABSTRACT

An active matrix display device comprises an array of display elements (12), e.g. liquid crystal display elements, connected between sets of row and column address conductors (22,24). A display element electrode (20) is connected to an associated address conductor (22) of one set via two, parallel, switch means each of which comprises at least two, two-terminal, bi-directional, non-linear devices (30), for example, MIM type thin film diode devices, connected in series. A bidirectional, non-linear device (e.g. 30b) of each switch means (e.g. 30a, 30b) is shared by, and comprises a part of, a switch means (e.g. 30b, 30e) associated with a respective adjacent display element, there being in each switch means at least one non-linear device (e.g. 30a) between the shared device (30b) and the display element electrode (20). In addition to providing fault tolerance in the event of a defective, open-circuit, device (30), the arrangement also allows any defective, short-circuit, device to be easily identified and removed.

4 Claims, 2 Drawing Sheets

ACTIVE MATRIX DISPLAY DEVICES HAVING BIDIRECTIONAL NON-LINEAR DEVICES CONNECTED BETWEEN ADJACENT PIXELS AND RESPECTIVE ADDRESS CONDUCTOR

BACKGROUND OF THE INVENTION

This invention relates to an active matrix display device having a row and column array of display elements comprising spaced electrodes with electro-optical material therebetween and connected between sets of row and column address conductors, and in which the display elements of a row are each connected to a respective address conductor of one set via two parallel switch means which each comprise at least two, bidirectional, non-linear devices connected in series.

A display device of the above kind may be used for datagraphic or video, e.g. T.V., display purposes.

An active matrix liquid crystal display device in which each display element is connected in series with a switch means between row and column address conductors carried on opposed supporting plates and in which each switch means comprises two bidirectional thin film diodes (TFDs) is disclosed in the paper by Hirai et al entitled "Flicker-Free LCD with Bridge Structure SiNx TFD" in SID 90 Digest, pages 522 to 525. By using two TFDs the switch means is given a substantially symmetrical current/voltage characteristic when driven using voltages of one polarity and voltages of the opposite polarity.

It is known also in active matrix display devices generally to connect a plurality of switch means in parallel between a display element electrode and an associated address conductor for redundancy purposes. An example of such a display device is described in EP-A-0460747. In this display device the display elements, comprising liquid crystal elements, are each defined by a pair of display element electrodes carried on respective glass supporting plates between which liquid crystal material is disposed. The plates carry respectively sets of row and column address conductors and individual display elements are provided at the region of the intersections of the crossing row and column address conductors. One display element electrode of each display element in a row is connected to a respective address conductor on the one plate via a switch means comprising two bidirectional thin film diodes (TFDs) in the form of MIM elements connected in series which are also carried on that plate. The two series connected MIM elements associated with a display element act as a switch means having a threshold characteristic which, in response to a predetermined voltage applied between the row and column address conductors associated with that display element, is turned on so as to transfer a charge to the display element thereby causing a desired display effect. In an embodiment of a display device disclosed in this specification, each display element electrode is connected to the address conductor on the one plate via a plurality of such switch means connected in parallel between the display element and the address conductor.

The use of the two series-connected TFDs, such as MIMs, rather than a single TFD as is more common, is important particularly for datagraphic displays. Ageing effects in TFDs cause drift in their operational behaviour (I-V characteristic) and in the case of a single TFD being used the extent of such drift may differ for individual display elements if their associated TFDs do not on average receive the same drive voltages, and thus suffer the same stress, over a period of time in operation. By using two TFDs, in series, the amount of shift is reduced.

In fabricating the display devices, defects can occasionally occur in the TFDs. For a large area display device having a few hundred thousand TFDs the probability of one, or more, TFDs being found to be faulty is not insignificant. Most often the fault is likely to be a short so that the defective TFD is permanently short-circuited between its terminals. However, faults leading to a permanently open circuit between the TFD's terminals can also occur. By providing two (or more) switch means in parallel between a display element and its address conductor, problems caused by defective devices can be overcome. In the case for example of a TFD in one switch means being open circuit then the display element is driven simply through the other switch means. In the case of a TFD being short-circuit, the relevant faulty switch means can be permanently disconnected in known manner from the display element's circuit by, for example, laser scribing, leaving the other switch means then to operate alone in driving the display element. However, before such disconnection can be effected, it is necessary to identify the particular TFD which is defective, or at least the switch means containing the defective TFD, and this can prove difficult and time consuming. One technique, for example, involves the visual inspection of individual circuit elements under a microscope.

SUMMARY OF THE INVENTION

According to the present invention, there is provided an active matrix display device of the kind described in the opening paragraph which is characterised in that a respective bidirectional non-linear device of each of the two switch means connected between a display element and an address conductor is shared by, and comprises a part of, one of the switch means connected between a respective adjacent display element and that address conductor, and in that at least one other bidirectional, non-linear device of each switch means is connected between the shared device and its associated display element. With this arrangement, the identification of an individual switch means containing a defective, short-circuit, non-linear device is greatly facilitated. If, for example, the non-linear device which is shared by two switch means is short-circuited then the two adjacent display elements concerned will be affected and the faulty device can easily be identified by virtue of their display outputs when predetermined test voltages are applied. If, on the other hand, a non-linear device which is not shared between two switch means is short-circuited, then the defective device will predominantly affect the display output from only one display element. The particular one of the two switch means connected to the display element containing the defective device, bearing in mind that each of these switch means includes a non-linear device which is not shared, can then be determined comparatively easily, for example, by changing test drive signals or polarity applied to adjacent display elements. Having identified the switch means containing the defective device, this switch means can then be disconnected from the circuit by laser scribing. The display element concerned will then be addressed solely via its other switch means.

In the event of one of the two switch means connected to a display element containing an open circuit non-linear device, then the display element is addressed via its other switch means and will continue to function properly without any remedial action being necessary. The two switch means associated with each display element thus offer fault tolerance to open circuit devices.

Consequently, the invention offers the advantages of, firstly, enabling short-circuit non-linear devices to be easily identified and removed from the circuit, whilst still allowing series-connected non-linear devices to be used for the switch means, and, secondly, of being compatible with open circuit fault tolerance schemes.

A further advantage is that for display devices using switch means comprising a given number of non-linear devices there is a reduction in the overall number of non-linear devices required in the panel.

Preferably, each switch means comprises two bidirectional non-linear devices connected directly in series with the first non-linear device being connected directly to the display element and the second device, which is connected directly to the address conductor, being common to a switch means of an adjacent display element. The number of devices required is then minimised. However, in certain cases each switch means may comprise more than two non-linear devices. For example, each switch means may comprise three non-linear devices connected in series with the one which is connected directly to the address conductor being common to the switch means of an adjacent display element. Alternatively, two of the three non-linear devices, that is, the two devices closest to the address conductor, may be shared between switch means of adjacent display elements.

The bidirectional, two terminal, non-linear devices can be of various kinds as known in the art. Preferably the devices comprise thin film diode devices such as MIMs, as mentioned previously, M-n-i-n-M, M-p-i-p-M, M-i-S, M-p-i-n-M or similar structures, or back to back Schottky diode devices. These devices are all bidirectional, exhibiting a substantially symmetrical threshold characteristic and allowing current to flow therethrough in both directions when biassed in opposite senses and when reversing the polarity of an applied voltage.

The invention is particularly applicable to display devices comprising liquid crystal display elements but may be used as well in other kinds of matrix display devices, for example comprising electrophoretic or electrochromic display elements.

BRIEF DESCRIPTION OF THE DRAWINGS

Embodiments of active matrix display devices, and in particular liquid crystal display devices, in accordance with the present invention will now be described, by way of example, with reference to the accompanying drawings in which.

DESCRIPTION OF THE PREFERRED EMBODIMENTS

Figure 1:
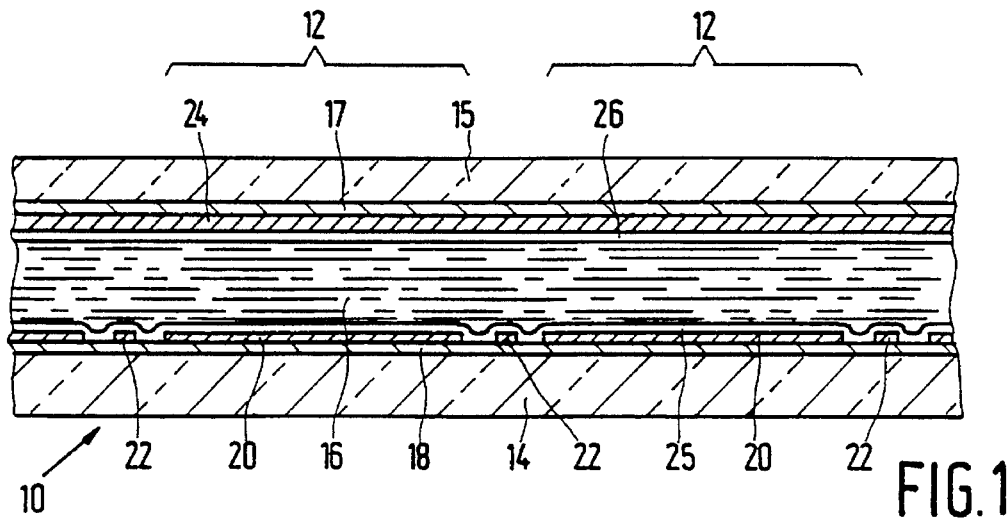
FIG. 1 is a schematic cross-sectional view through a part of the display device.

Referring to FIG. 1, the display device comprises a liquid crystal display panel 10 having a row and column matrix array of individual display elements 12, only two of which are depicted in FIG. 1. Each element 12 comprises a pair of electrodes carried on the facing surfaces of two, spaced, glass substrates 14 and 15 between which twisted nematic liquid crystal material 16 is disposed. The facing surfaces of the substrates 14 and 15 are covered with continuous layers 17 and 18 of electrically and chemically insulating material. The substrate 14 carries an array of individual, generally rectangular, display element pad electrodes go of transparent conductive material, for example, ITO, arranged in rows and columns and defining individual display elements 12. The substrate 15, as is usual for such display devices, carries a set of spaced, parallel, column address conductors 24, comprising strips of transparent ITO portions of which, where they overlie display element electrodes 20, constitute the other electrodes of the display elements.

The display element electrodes go of all picture elements in the same row are connected on the substrate 14 to an associated one of a set of parallel row address conductors 22, extending at right angles to the column conductors 24, via associated switch means comprising two terminal, bidirectional current, non-linear devices (not visible in FIG. 1) in the form of MIM type thin film diodes which are carried on the substrate 14 adjacent their respective display element electrodes 20 and which are connected in a particular manner as will be described subsequently. Respective continuous LC orientation layers 25 and 26 cover the structures on the substrate 14 and 15. The outer surfaces of the substrates 14 and 15 are covered by polarising layers (not shown) in conventional manner.

The individual display elements 12 are addressed in conventional fashion a row at a time in sequence by applying scanning signals to each row conductor 22 in turn and video data signals to the column conductors appropriately in synchronism to operate the display elements and modulate light transmission therethrough in accordance with supplied video information. The elements are typically driven using an applied voltage of between 11 and 15 volts, and are addressed on a row at a time basis so as to build up a display picture over one field. Apart from the manner in which the non-linear devices are arranged between the display elements and their row address conductors, as will be described, the display device, its operation, and its method of construction are similar in many respects to known active matrix LC display devices using two-terminal, bidirectional current, non-linear switching elements. Accordingly, the foregoing general description has deliberately been kept brief. For further information in these respects, reference is invited to the publications mentioned earlier and U.S. Pat. No. 4,642,620 as examples whose disclosures are incorporated herein by reference.

Figure 2:
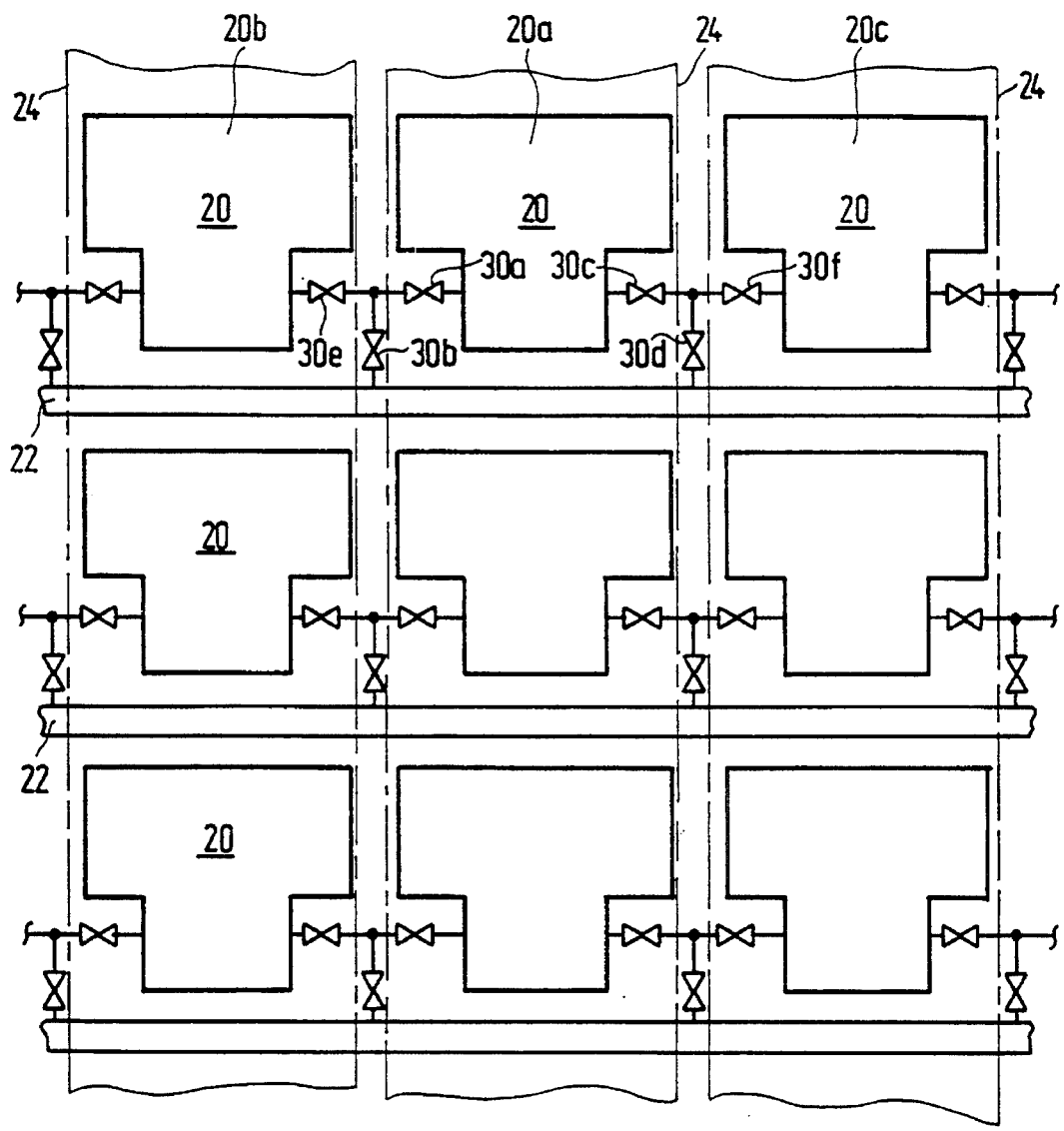
FIG. 2 is a plan schematic view of a part of the display device illustrating the circuit configuration of a few typical display elements.

Referring now to FIG. 2, a typical, small, group of display elements in the array, comprising three adjacent display elements in three successive rows, is depicted schematically in plan view which illustrates the arrangement of the bidirectional non-linear devices, here referenced 30, connected between their electrodes 20 and their associated row address conductors The corresponding portions of the column address conductors 24 also shown in broken outline. It will be appreciated that, altogether, the display panel 10 may comprise a few hundred thousand display elements 12.

Each display element electrode 20 is connected to its row address conductor via two switch means connected electrically in parallel, each of which is constituted by a non-linear circuit consisting of two bidirectional non-linear devices 30 connected in series. A respective non-linear device 30 of each of the two switch means associated with an individual electrode 20 comprises a part also of a switch means connected to a respective adjacent display element, the arrangement being such that each switch means has at least one non-linear device connected between the shared device and its associated display element. A bidirectional non-linear device is thus common to two switch means connected to respective adjacent display elements, and each of the two, parallel, switch means connected between a display element and an address conductor includes a non-linear device which is common to switch means connected to different adjacent display elements. Thus, for example, the display element electrode indicated at 20a is connected to its address conductor 22 via a first switch means comprising the series connected devices 30a and 30b and also via a second, parallel, switch means comprising the devices 30c and 30d. The non-linear device 30b of one of its switch means is shared by, and comprises a part of, one of the switch means connected to the adjacent electrode 20b to the left of the electrode 20a, this switch means comprising the series-connected devices 30e and 30b. Similarly, the device 30d of its other switch means is common to one of the switch means associated with the other adjacent display element electrode 20c, this switch means comprising the series-connected devices 30f and 30d. The second switch means associated with each of two immediately adjacent electrodes 20b and 20c each in turn share a non-linear device with a switch means of their respective adjacent display elements, and so on. Each immediately adjacent pair of display element electrodes in a row is thus in effect interconnected through two non-linear devices in series, e.g. devices 30a and 30e for the electrodes 20a and 20b, with the junction between these two devices being connected to the row address conductor 22 via a shared non-linear device, e.g. device 30b. The display elements are each connected to this shared device through a non-linear device, e.g. 30a, 30c, which is associated solely with the respective display element. The outermost switch means of each of the two display elements located at the two ends of each row does not contain shared device.

The two switch means associated with each display element, for example the switch means constituted by the devices 30a and 30b and the switch means constituted by the devices 30c and 30d in the case of the display element electrode 20a, provide fault tolerance in the event of a device in one switch means being defective and open circuit. The display element concerned is then addressed solely through its other switch means. If, for example, the device 30c is open circuit then the electrode 20a will be driven via the devices 30a and 30b. In this case the neighbouring display element can continue to be addressed via the switch means comprising the devices 30d and 30f. If, on the other hand the device 30d is open circuit then that neighbouring display element is addressed solely through its other switch means as well.

Because each switch means consists of two series-connected non-linear devices the extent of any drift effect in the I-V behaviour of a non-linear device due to ageing is reduced.

To some extent each switch means can be tolerant also to a defective, short-circuit, non-linear device as the remaining non-linear device can continue to perform a switching function. However, there will be a risk of damage occuring to the remaining device. Also, an imbalance then exists between the operational behaviour of the two switch means associated with the display element. The display output produced by the display elements concerned will be affected due to voltage degradation by leakage, resulting in reduced contrast which could be particularly noticeable in the case of a datagraphic display. Thus, it is preferable to disconnect the switch means containing the defective, short-circuit, device from the display element drive circuit. To this end, known laser scribing techniques can, for example, be employed. Before this can be accomplished, however, it is necessary to identify the non-linear device which is defective. The particular layout of the non-linear devices 30 enables such identification to be achieved much more easily than with known display devices, bearing in mind of course that such faults are usually discovered after final assembly and during testing of the device when it is no longer possible to access directly components of the active matrix array.

If a non-linear device 30 directly contacting a row address conductor 22 is shorted then the display outputs of two adjacent display elements 12 will be affected so that identification of the defective device is easily deduced using a light-sensing probe to measure individual display element outputs when driving with predetermined test voltages.

If a non-linear device 30 directly contacting a display element electrode 20 is shorted, then the effect will predominantly be on one display element. Having identified a faulty display element by using a probe to inspect the display element outputs, it then becomes necessary to establish which of the two switch means connected to that display element contains the defective device. This can be achieved by applying predetermined test drive voltages and by changing signals or polarity on the adjacent column conductors 24. By way of example, the faulty display element together with the display elements to either side are addressed twice with test drive voltages. In the first address, the voltages applied to the faulty display element and the display element to its left are the same while voltages of the same magnitude but of opposite polarity are applied to the display element to its right. In the second address, the procedure is repeated but with the display elements to the right and left of the faulty display element being driven respectively with the same voltages as the faulty element and with the opposite polarity voltages. When the display element to the side of the faulty element on which defective non-linear device is located-in driven with the opposite polarity voltages then a detectable change in contrast of the display output occurs, thus identifying the defective switch means.

Figure 3A:
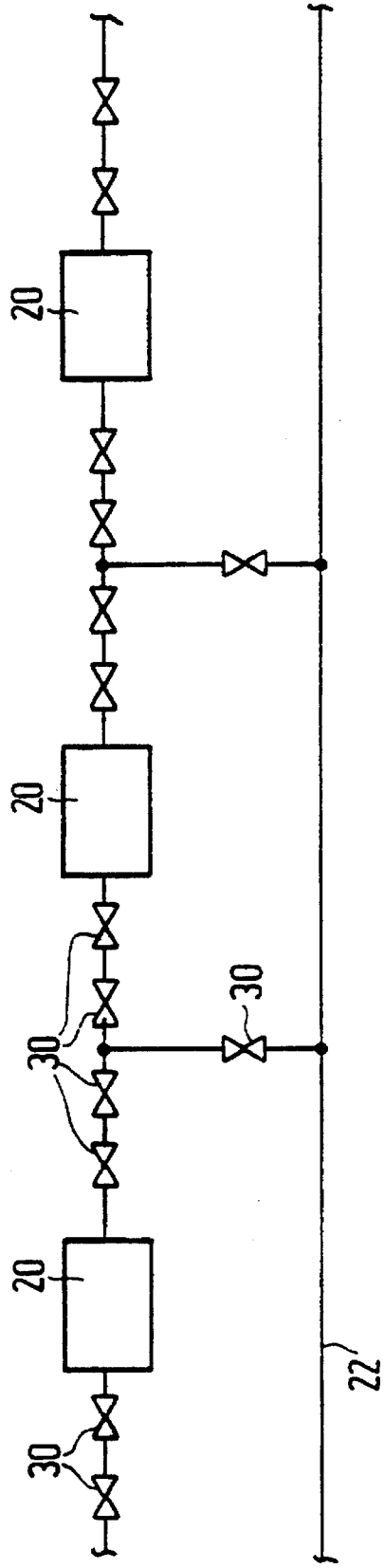
FIGS. 3A and 3B illustrate schematically two alternative circuit configurations, The same reference numerals are used throughout the drawings to indicate the same or similar parts.
Figure 3B:
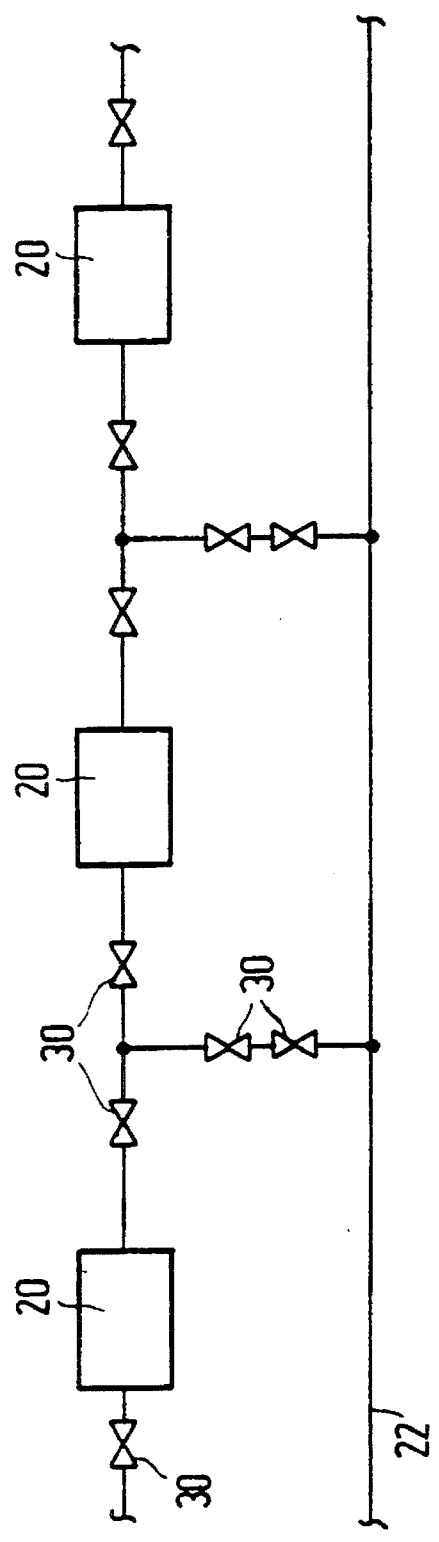

Two possible alternative arrangements for the switch means are illustrated schematically in FIGS. 3A and 3B which each show a typical group of three adjacent display elements in one row. In both arrangements, each switch means comprises three series-connected bidirectional non-linear devices 30. In the FIG. 3A arrangement, a single non-linear devices 30 closest to the row conductor of each of the two switch means associated with one display element are each shared by respective switch means associated with the adjacent display elements to either side of that display element. In the FIG. 3B embodiment, the two directly-connected non-linear devices 30 closest to the row conductor 22 of each of the two switch means associated with one display element are both shared by respective switch means associated with the display elements to either side of that display element. Obviously, these arrangements require more non-linear devices than in the above-described embodiment. However, there may be circumstances where, due to the nature of the devices for example, it is preferable to use three rather than two in series in each switch means.

The two terminal, bidirectional non-linear devices may be of any known kind. Preferably each device 30 comprises a thin film diode (TFD) device, such as a MIM type device as described. They may be non-stoichiometric TFDs of the kind described in the aforementioned article by Hirai et al. Other TFDs comprising, for example, M-n-i-n-M, M-i-S, or back to back Schottky diode structures can be used.

In an alternative embodiment, the non-linear devices may instead be connected between the display elements and the column address conductors in which case references to row and column address conductors in the above description should be interchanged.

The display device can be of the type using a polymer dispersed liquid crystal material. In this case only one supporting glass structure may be necessary.

From reading the present disclosure, other modifications will be apparent to persons skilled in the art. Such modifications may involve other features which are already known in the field of active matrix display devices and which may be used instead of or in addition to features already described herein.

I claim:

1. An active matrix display device having a row and column array of display elements comprising spaced electrodes with electro-optical material therebetween and connected between sets of row and column address conductors, and in which the display elements of a row are each connected to a respective address conductor of one set via two parallel switch means which each comprise at least two, bidirectional, non-linear devices connected in series, characterized in that a respective bidirectional non-linear device of each of the two switch means connected between a display element and an address conductor is shared by, and comprises a part of, one of the switch means connected between a respective adjacent display element and that address conductor, and in that at least one other bidirectional, non-linear device of each switch means is connected between the shared device and its associated display element.

2. An active matrix display device according to claim 1, characterized in that each switch means comprises first and second bidirectional, non-linear devices connected directly in series with the first non-linear device being connected directly to the address conductor and shared by a switch means of an adjacent display element and with the second non-linear device being connected directly to the display element.

3. An active matrix display device according to claim 1, characterised in that the bidirectional, non-linear devices each comprise a thin film diode device.

4. An active matrix display device according to claim 2, characterized in that the bidirectional, non-linear devices each comprise a thin film diode device.

* * * * *